Jan. 30, 1923.
P. H. LETCHFORD.
HEADLIGHT.
FILED NOV. 13, 1920.
1,443,822.
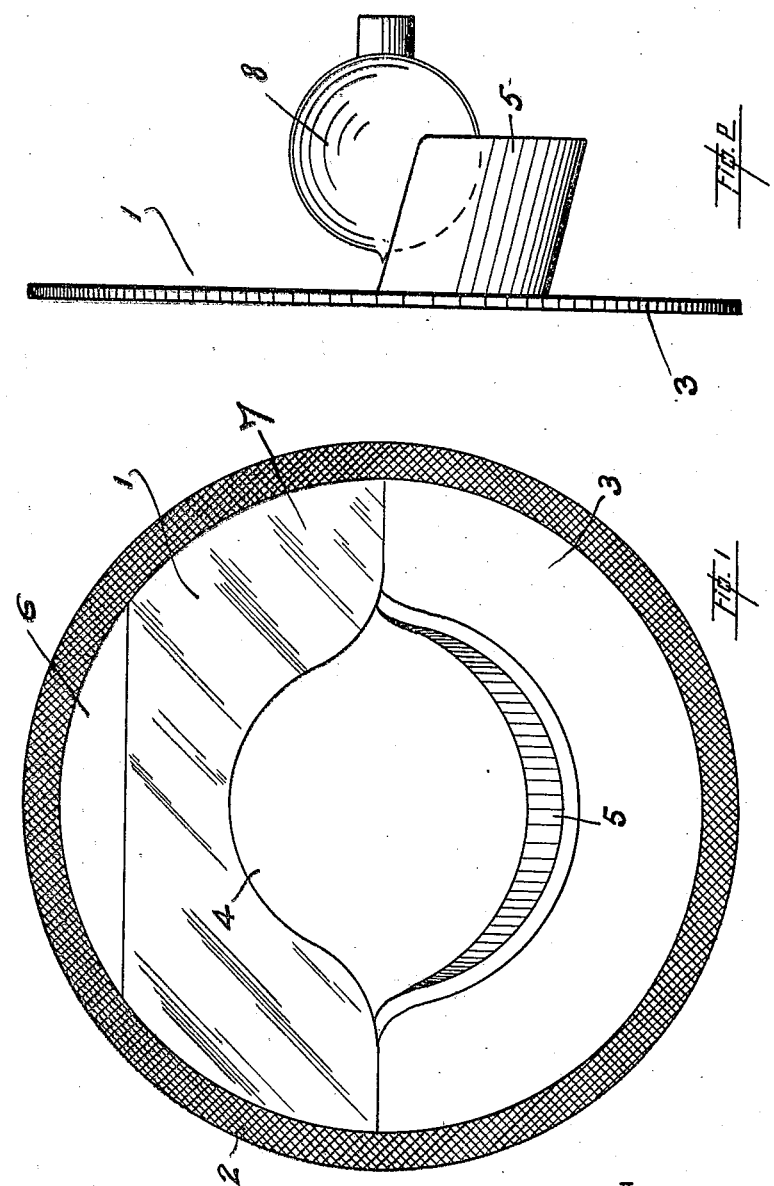
INVENTORS.
Percy Horace Letchford Patented Jan. 30, 1923.

1,443,822

UNITED STATES PATENT OFFICE.

PERCY HORACE LETCHFORD, OF WINNIPEG, MANITOBA, CANADA.

HEADLIGHT.

Application filed November 13, 1920. Serial No. 423,862.

*To all whom it may concern:*

Be it known that I, PERCY HORACE LETCHFORD, a subject of the King of Great Britain, and a resident of the city of Winnipeg, in the Province of Manitoba, Canada, have invented certain new and useful Improvements in Headlights, of which the following is a specification.

My invention relates to improvements in headlights, with more particular reference to the glass thereof, and the object of my invention is to provide a headlight glass for automobiles and other moving vehicles which eliminates the glare yet enables a good driving light to be obtained, which requires no extraneous elements for its effective operation, but it is entirely self-contained, and which is inexpensive to manufacture and sell, besides being of great convenience and utility both from the driver's standpoint and that of pedestrians and drivers of oncoming vehicles.

I attain this object by the construction illustrated in the accompanying drawings in which Fig. 1 is a rear view of the glass.

Fig. 2 is a side view.

Similar figures of reference indicate similar parts in the views.

1 indicates the glass, of suitable size to fit the headlight rim and corrugated adjacent its outer edge, as at 2, for its better retention when in place. The lower half or semi-circular surface 3 of the glass is rendered translucent by any approved means, such as sanding, the upper edge of this translucent portion 3 being extended centrally upwards, as shown at 4 in Fig. 1, and on the inner side of the glass behind the translucent lower half 3 and at the base of the extension 4 is secured a substantially U-shaped reflector 5, of glass or other suitable material, which reflector extends inwardly and within which the headlight lamp bulb 8 is located substantially concentrically to the reflector so that the tip of the lamp is centered with respect to the extension 4. A small portion of the glass, indicated by the numeral 6, is also rendered translucent, on which portion the light rays, deflected upwardly by the reflector, strike to be directed forwardly through the transparent remaining portion 7 of the glass. This translucent portion, 6 may be omitted, but its use is desirable, as it increases the efficiency of the device.

By the use in vehicle headlights of such a glass as that described in the foregoing the objectionable glare so common at the present time is entirely eliminated, while a good driving light on the road is obtained. Further, by rendering a portion of the glass itself translucent a headlight glass is provided having the dimmer incorporated therewith so that the desired result is secured in a very simple, inexpensive, and highly practical manner without the use of separate devices which involve a certain amount of time, labour, and trouble in their installation.

It will be seen, therefore, that I have provided a means for eliminating the glare of vehicle headlights which is of high practical value.

What I claim as my invention is:

A lens having the lower half thereof entirely translucent, said translucent portion having the central portion of its upper edge projecting upwardly above the horizontal axis of the lens to form a translucent extension adapted to be exposed directly in front of the headlight lamp, and an arcuate reflector integral with the lens projecting outwardly therefrom and positioned directly behind said translucent portion, said reflector being positioned with its ends curving upwardly and terminating at the horizontal axis of the lens and on opposite sides of said extension.

Signed at Holland, Man., this 20th day of October, 1920.

PERCY HORACE LETCHFORD.